United States Patent [19]

Ward et al.

[11] 4,428,825
[45] Jan. 31, 1984

[54] CATALYTIC HYDRODEWAXING PROCESS WITH ADDED AMMONIA IN THE PRODUCTION OF LUBRICATING OILS

[75] Inventors: John W. Ward, Yorba Linda; Timothy L. Carlson, Placentia, both of Calif.

[73] Assignee: Union Oil Company of California, Los Angeles, Calif.

[21] Appl. No.: 357,133

[22] Filed: Mar. 11, 1982

Related U.S. Application Data

[63] Continuation-in-part of Ser. No. 267,247, May 26, 1981, which is a continuation-in-part of Ser. No. 172,868, Jul. 28, 1980, abandoned.

[51] Int. Cl.³ .................... C10G 47/16; C10G 65/12
[52] U.S. Cl. ..................................... 208/109; 208/18; 208/108; 208/110; 208/111; 208/112
[58] Field of Search ............... 208/108, 109, 110, 111, 208/112, 18, 57, 58, 59, 89

[56] References Cited

U.S. PATENT DOCUMENTS

| | | | |
|---|---|---|---|
| 3,438,887 | 4/1969 | Morris et al. | 208/87 |
| 3,487,005 | 12/1969 | Egan et al. | 208/59 |
| 3,539,498 | 11/1970 | Morris et al. | 208/111 |
| 3,551,325 | 12/1970 | Rausch | 208/89 |
| 3,565,788 | 2/1971 | Foucher, Jr. et al. | 208/111 |
| 3,702,886 | 11/1972 | Argauer et al. | 208/111 X |
| 3,730,876 | 5/1973 | Sequeira, Jr. | 208/59 |
| 3,755,138 | 8/1973 | Chen et al. | 208/33 |
| 3,755,145 | 8/1973 | Orkin | 208/111 |
| 3,794,580 | 2/1974 | Ladevr | 208/110 |
| 3,806,445 | 4/1974 | Henry et al. | 208/87 |
| 3,853,749 | 12/1974 | Espenscheid et al. | 208/307 |
| 3,941,871 | 3/1976 | Dwyer et al. | 423/326 |
| 3,956,102 | 5/1976 | Chen et al. | 208/93 |
| 3,960,705 | 6/1976 | Garwood et al. | 208/111 |
| 4,061,724 | 12/1977 | Grose et al. | 423/335 |
| 4,073,865 | 2/1978 | Flanigen et al. | 423/339 |
| 4,100,056 | 7/1978 | Reynolds | 208/57 |
| 4,104,294 | 8/1978 | Grose et al. | 252/426 X |
| 4,124,650 | 11/1978 | Olavesen et al. | 208/111 X |
| 4,153,540 | 5/1979 | Gorring et al. | 208/89 |
| 4,176,050 | 11/1979 | Chen et al. | 208/111 |
| 4,181,598 | 1/1980 | Gillespie et al. | 208/58 |
| 4,208,305 | 6/1980 | Kouwenhoven et al. | 423/326 X |
| 4,211,634 | 7/1980 | Bertolacini et al. | 208/59 |
| 4,211,635 | 7/1980 | Chen | 208/93 |
| 4,238,316 | 12/1980 | Mooi et al. | 208/58 |
| 4,259,174 | 3/1981 | Chen et al. | 208/111 |
| 4,277,635 | 7/1981 | Oulman et al. | 568/916 |
| 4,283,271 | 8/1981 | Garwood et al. | 208/59 |
| 4,283,272 | 8/1981 | Garwood et al. | 208/59 |
| 4,283,306 | 8/1981 | Herkes | 423/328 X |
| 4,299,808 | 11/1981 | Klotz | 423/331 |
| 4,302,323 | 11/1981 | Chen | 208/89 |
| 4,313,817 | 2/1982 | Mayer et al. | 208/89 |
| 4,325,805 | 4/1982 | Miller | 208/58 |

FOREIGN PATENT DOCUMENTS

35807 9/1981 European Pat. Off.
8001342 7/1981 Netherlands.
2056961A 3/1981 United Kingdom.

OTHER PUBLICATIONS

Olson et al., "Chemical & Physical Properties of the ZSM-5 Substitutional Series", J. Catalysis 61, 390–396 (1980).

"Silicalite,, a New Hydrophobic Crystalline Silica Molecular Sieve", by Flanigen et al., set forth in *Nature*, vol. 271, pp. 512 to 516, Feb. 9, 1978.

"Silicalite-2, a Silica Analogue of the Aluminosilicate Zeolite ZSM-11", by Bibby et al., set forth in *Nature*, vol. 280, pp. 664 and 665, Aug. 23, 1979.

"Crystal Structure of Tetrapropylammonium Fluoride-Silicalite", by Price et al., set forthin *Nature*, vol. 292, pp. 818 and 819, Aug. 27, 1981.

"Make Olefins from Syn Gas", by Rao et al. set forth in *Hydrocarbon Processing*, Nov. 1980, pp. 139 to 142.

"Pulsed Proton Nuclear Magnetic Resonance Study of Water Mobility in Pentasils ZSM-5 and Silicalite", by Maiwald et al. set forth in *Proceedings of the Fifth International Conference on Zeolites*, edited by Dr. L. V. C. Rees, Jun. 2–6, 1980, pp. 562 to 570.

"Molecular Sieve Borosilicates", by Taramasso et al. set forth in *Proceedings of the Fifth International Conference on Zeolites*, edited by Dr. L. V. C. Rees, Jun. 2–6, 1980, pp. 40 to 48.

"Catalytic Dewaxing Process Improved", by Donnelly et al. in *Oil and Gas Journal*, Oct. 27, 1980, pp. 77–82.

"Reactions on ZSM-5 Type Zeolite Catalysts", by Anderson et al., in *Journal of Catalysis*, vol. 58, pp. 114 to 130 (Jun. 15, 1979).

"Pentasil Family of High Silica Crystalline Materials", by Kokotailo et al., set forth in The Properties and Applications of Zeolites, Townsend, ed., *The Chemical Society*, Burlington House, London, WIV OBN, Special Publication No. 33.

"When is a Zeolite not a Zeolite?", by Rees set forth in *Nature*, vol. 296, Apr. 8, 1982, pp. 491 to 492.

"Research Article Triggers Dispute on Zeolite", by Budiansky set forth in *Nature*, vol. 300, Nov. 25, 1982, p. 309.

"Resolving Crystallographically Distinct Tetrahedral Sites in Silicalite and ZSM-5 by Solid–State NMR", by Fyfe et al., set forth in *Nature*, vol. 296, Apr. 8, 1982, pp. 530–533.

"Zoned Aluminum Distribution in Synthetic Zeolite ZSM-5", by Ballmoos et al., in *Nature*, vol. 289, Feb. 26, 1981, pp. 782 and 783.

*Primary Examiner*—Delbert E. Gantz
*Assistant Examiner*—George Schmitkons

[57] ABSTRACT

Improved lubricating oils are produced from waxy oils and the like by catalytically hydrodewaxing in the presence of added ammonia. Less hydrogen is consumed in the process, even at relatively high operating temperatures, and the resultant product is of increased viscosity index.

38 Claims, No Drawings

CATALYTIC HYDRODEWAXING PROCESS WITH ADDED AMMONIA IN THE PRODUCTION OF LUBRICATING OILS

CROSS-REFERENCE TO RELATED APPLICATIONS

This application is a continuation-in-part of U.S. patent application Ser. No. 267,247 filed May 26, 1981, which itself is a continuation-in-part of U.S. patent application Ser. No. 172,868 filed July 28, 1980, abandoned.

BACKGROUND OF THE INVENTION

This invention relates to the refining of hydrocarbons, and more particularly to the production of lubrication oils by catalytic hydrodewaxing.

In the production of lubricating oils, a petroleum refiner is often confronted with the problem of removing waxy paraffinic materials from hydrocarbon liquids which could otherwise be easily upgraded to lubricating oil base stocks and the like. The presence of the waxy paraffins is undesirable because they impart an unacceptably high pour point to the oil, thereby reducing the effectiveness of the oil under low temperature conditions.

The production of lubricating oils, therefore, often requires a process step for removing waxy paraffins, as for example by solvent dewaxing. Yet another method is catalytic dewaxing wherein the waxy feedstock, usually a waxy distillate obtained from a previous refining operation, is contacted with a suitable catalyst under conditions of elevated temperature and pressure so as to crack the waxy paraffins to other hydrocarbons having less effect upon the pour point. In general, the catalyst is highly selective for cracking the waxy components, and oftentimes the catalyst employed has hydrogenation activity such that, in the presence of hydrogen, the cracked components are essentially immediately saturated by hydrogenation. Dewaxing in this manner is usually referred to as "hydrodewaxing," and the catalyst employed is termed a hydrodewaxing catalyst.

Besides an acceptable pour point, the lubricating oil obtained from hydrodewaxing or other dewaxing operation must often meet or exceed established criteria, as for example, a specified viscosity index for the particular application in which the lubricating oil will find service. As a rule, the higher the viscosity index of a given lubricating oil, the more desirable it is, assuming that the viscosity index is increased without detrimentally affecting other desired properties of the oil.

Accordingly, it is a major object of the present invention to provide a novel catalytic hydrodewaxing process wherein a product lubricating oil of improved viscosity index is obtained without detrimentally affecting its other properties, as for example its pour point. It is yet another object of the invention to provide such a product in a high yield but with relatively low hydrogen consumption, even at relatively high operating temperatures. And it is a specific object of the invention to provide a novel hydrodewaxing process wherein the selectivity for an improved lubricating oil product is high, despite a relatively high operating temperature. These and other objects of the invention will become more apparent in view of the following description of the invention.

SUMMARY OF THE INVENTION

In the present invention, lubricating oils are produced in a refining process comprising catalytically hydrodewaxing a hydrocarbon feedstock in the presence of added ammonia. The addition of ammonia yields several improved results. In particular, in comparison to operation without added ammonia, the present invention allows for higher operating temperatures with essentially no loss in product yield, provides for reduced hydrogen consumption, even at the higher operating temperatures, and yields a product of similar pour point but of enhanced viscosity properties, as evidenced, for example, by an increased viscosity index.

DETAILED DESCRIPTION OF THE INVENTION

The process of the present invention is directed to the production of lubricating oils and the like by catalytically hydrodewaxing a waxy hydrocarbon in the presence of a catalyst. The most preferred feedstocks for treatment herein are waxy oils such as waxy raffinates or waxy distillates, but on occasion, such feedstocks as deasphalted vacuum residua and heavy gas oils may also be treated. In general, the more suitable feedstocks contain a substantial proportion of hydrocarbon components boiling above 650° F., with at least 80% by volume usually boiling in the 650° F. to 1150° F. range. The feedstock may also contain organosulfur and/or organonitrogen compounds, typically in concentrations between 50 and 1000 ppm by weight of total sulfur and between 50 and 400 by weight of total nitrogen, respectively. In addition, the feedstock is generally free of asphaltenes, or essentially so, and usually contains assorted naphthenes, aromatics, and paraffins. The most typical feedstock for treatment herein has an undesirably high pour point, usually above 70° F., more usually above 80° F., and most usually above 90° F., the high pour points being due in large measure to the presence of waxy paraffins, i.e., relatively high molecular weight, straight and slightly branched saturated hydrocarbons of formula $C_nH_{2n+2}$. Total paraffin content of typical paraffinic stocks is often above about 10 percent by weight, often above 15 percent by weight, and in many instances the 650° F.+ fraction of the feedstock itself contains 15 percent by weight or more of total paraffins.

In accordance with the invention, the selected feedstock is catalytically hydrodewaxed in the presence of a suitable catalyst and added ammonia. The catalyst is preferably comprised of a Group VIB metal hydrogenation component, and more preferably still, is comprised of both Group VIB and Group VIII metal hydrogenation components. The hydrogenation components are most usually in an oxide, sulfide, or free metal form and are dispersed upon a support material typically containing a catalytically active dewaxing component in intimate admixture with a porous refractory oxide. The preferred Group VIB metal hydrogenation components contain molybdenum or tungsten, and the preferred Group VIII metal hydrogenation components contain iron, cobalt, or nickel. The most highly preferred catalyst comprises both nickel and tungsten components, especially in the sulfide form. The proportion by weight of the catalyst that comprises the Group VIB metal components is between about 5 and 40%, preferably between about 15 and 30%, calculated as the metal trioxide. The proportion by weight of the catalyst that comprises the Group VIII metal components is between about 0.5 and 15%, preferably between about 1 and 5%, calculated as the metal monoxide.

The amorphous porous refractory oxides useful in the supports of the hydrodewaxing catalysts include the oxides of difficultly reducible metals, particularly those containing aluminum. Representative of such refractory oxides are alumina, silica, beryllia, chromia, zirconia, titania, magnesia, and thoria. Also representative are silica-alumina, silica-titania, silica-zirconia, silica-zirconia-titania, zirconia-titania, and other such combinations. A specific refractory oxide known to be useful consists essentially of a dispersion of finely divided silica-alumina in a matrix of alumina; this material is more fully described in U.S. Pat. No. 4,097,365, herein incorporated by reference in its entirety. The preferred refractory oxide, however, is alumina, most preferably, gamma alumina, and as with all the refractory oxides contemplated herein, the preferred gamma alumina has a surface area above about 100 m$^2$/gm.

In the usual instance, the amorphous porous refractory oxides are insufficient of themselves to provide the requisite dewaxing activity desired in most hydrodewaxing catalysts. Most refractory oxides are either substantially inert for catalytic dewaxing reactions or have nonselective (i.e., indiscriminate) activity for cracking hydrocarbons, unnecessarily cracking many hydrocarbons in addition to the waxy components most desired to be removed from lubricating oils. As a result, the hydrodewaxing catalyst is normally provided with one or more catalytic dewaxing components having substantial catalytic activity and selectivity for dewaxing, and these components are dispersed in or admixed with the refractory oxide such that the resultant carrier (or support) contains between about 5 and 50% by weight of the dewaxing component(s). Suitable catalytic dewaxing components include the natural and synthetic forms of such zeolites as mordenite, clinoplolite, offretite, and erionite, these then usually being converted to a catalytically active form by introducing hydrogen ions into the ion exchange sites. Also suitable are porous crystalline silicates, such as those described in U.S. Pat. Nos. 4,104,294 and 4,208,305 and U.S. Patent Re. 29,948.

Another group of dewaxing components for use in the hydrodewaxing catalyst are the ZSM-5 type zeolites, a family of crystalline aluminosilicate materials having a porous structure of sufficient size to admit waxy paraffins while rejecting larger sized molecules. One zeolite in this family is ZSM-5 itself, which is disclosed in U.S. Pat. No. 3,702,886, herein incorporated by reference in its entirety. Other members of the "ZSM-5 family" include (but are not limited to) ZSM-11, ZSM-12, ZSM-23, ZSM-35, and ZSM-38, which are respectively disclosed in U.S. Pat. No. 3,709,979, U.S. Pat. No. 3,832,449, U.S. Pat. No. 4,076,842, U.S. Pat. No. 4,016,245, and U.S. Pat. No. 4,046,859, all of which are herein incorporated by reference in their entirety. These zeolites are known to readily adsorb benzene and normal paraffins, such as n-hexane, and also certain mono-branched paraffins, such as isopentane, but to have difficulty adsorbing di-branched paraffins, such as 2,2-dimethylbutane, and polyalkylaromatics, such as meta-xylene. These zeolites are also known to have a crystal density not less than 1.6 grams per cubic centimeter, a silica-to-alumina ratio of at least 12, and a constraint index, as defined in U.S. Pat. No. 4,229,282, incorporated by reference herein in its entirety, within the range of 1 to 12. The foregoing zeolites are also known to have an effective pore diameter greater than 5 angstroms and to have pores defined by 10 membered rings of oxygen atoms, as explained in U.S. Pat. No. 4,247,388, herein incorporated by reference in its entirety. Such zeolites are preferably utilized in the acid form, as by replacing at least some of the metals contained in the ion exchange sites of the zeolite with hydrogen ions. This exchange may be accomplished directly with an acid or indirectly by ion exchange with ammonium ions followed by calcination to convert the ammonium ions to hydrogen ions. In either case, it is preferred that the exchange be such that a substantial proportion of the ion exchange sites utilized in the catalyst support be occupied with hydrogen ions.

As an alternative to the foregoing zeolitic dewaxing components, one may also employ in the catalyst a crystalline silica polymorph, especially those having pore openings greater than 5 angstroms in maximum cross-sectional dimension, and particularly between 5 and 6 angstroms. Unlike the zeolites, the crystalline silicas are essentially free of Group IIIA metals, in particular aluminum, gallium, and boron. Among the suitable crystalline silica polymorphs for use as the dewaxing component are those disclosed in U.S. Pat. Nos. 4,073,865 and 4,283,306, both incorporated herein by reference in their entirety. Yet another crystalline silica dewaxing component, which is preferred above other crystalline silicas as well as the zeolites, is a polymorph known as silicalite, a material disclosed in U.S. Pat. No. 4,061,724 issued to Grose et al., herein incorporated by reference in its entirety. Silicalite may be characterized as a crystalline molecular sieve comprising a channel system (or pore structure) of intersecting elliptical straight channels and nearly circular straight channels, with openings in both types of channels being defined by 10 membered rings of oxygen atoms, such openings being between about 5 and 6 angstroms in maximum cross-sectional dimension. As reported by Flanigen et al. in "Silicalite, a New Hydrophobic Crystalline Silica Molecular Sieve" in *Nature,* Volume 271, pp. 512 to 516 (February 9, 1978), silicalite is a hydrophobic crystalline silica molecular sieve having the property under ambient conditions of adsorbing benzene (kinetic diameter 5.85 angstroms) while rejecting molecules larger than 6 angstroms, such as neopentane (kinetic diameter 6.2 angstroms). The silicalite disclosed in U.S. Pat. No. 4,061,724 is known to have an X-ray powder diffraction pattern similar to ZSM-5, but recently new silicalites having X-ray powder diffraction patterns similar to ZSM-11 have been discovered. (See Bibby et al., "Silicalite-2, a Silica Analog of the Aluminosilicate Zeolite ZSM-11" in *Nature,* Volume 280, pp. 664 to 665 (August 23, 1979).) While ZSM-11 type silicalites are contemplated for use herein, the preferred silicalite is that having an X-ray powder diffraction pattern similar to ZSM-5, which silicalite is known to have a mean refractive index of 1.39±0.01 when calcined in air for one hour at 600° C. This same silicalite is also reported in U.S. Pat. No. 4,061,724 to have a specific gravity at 25° C. of 1.70±0.05 g./cc., although Flanigen et al., in the February 9, 1978, *Nature* article previously specified, report the specific gravity as 1.76 g./cc. It appears, therefore, that this silicalite has a specific gravity between about 1.65 and about 1.80 g./cc., depending perhaps upon the method of preparation.

It should be emphasized that, although silicalite is similar to "ZSM-5 family" members in having a similar X-ray powder diffraction pattern, it is dissimilar in two important aspects. Unlike the "ZSM-5 family," silicalite is not an aluminosilicate, containing only trace proportions of alumina, due to the commerical impossibility of removing contaminant aluminum components from the reagents used to prepare silicalite. Silicalite may contain up to about 0.75 weight percent alumina, calculated as $Al_2O_3$, and is usually prepared to contain more than about 0.15 weight percent alumina. Most silicalites contain less than about 0.6 weight percent alumina, calculated as $Al_2O_3$. Additionally, as disclosed by Grose et al. in U.S. Pat. No. 4,061,724, neither "silicalite nor its silicate precursor exhibits ion exchange properties." Thus, silicalite does not share the zeolitic property of substantial ion exchange common to the crystalline aluminosilicates, and it therefore contains essentially no zeolitic metal cations. It is, however, possible to prepare silicalite with metals present therein as impurities but not as zeolitic cations (as by occlusion). Although operative for purposes herein, such metals-containing silicalites are not preferred. Silicalites containing total metals in only trace proportions, less than about 0.75 percent by weight, calculated as the metals, are preferred.

It should also be noted that silicalite, as taught by Grose et al., may be prepared from a reaction mixture containing organic reagents. Organic components may be present in the silicalite utilized in the invention, but such organic components are removed, usually to a proportion less than about 0.05 weight percent carbon, when the organic-containing silicalite is calcined, as for example, by calcining for one hour in air at 600° C. in accordance with Grose et al.'s teachings. Thus, the catalyst of the invention is preferably prepared with an essentially organic-free, previously calcined silicalite. In an alternative but nonpreferred embodiment, the organic-containing silicalite is not calcined until after it is admixed with the other components utilized to prepare the catalyst, e.g., the Group VIB component and gamma alumina. In other words, the silicalite becomes calcined during the same step of the catalyst preparation procedure designed primarily to convert the metal components to oxides. If this latter embodiment of the invention is chosen, it is preferred that the calcining be such that essentially no organic materials remain in the catalyst. Calcining at 600° C. in air for one hour in accordance with Grose et al.'s teachings is most preferred.

In the preferred embodiment of the invention, the support consists essentially of an intimate admixture of silicalite and a porous refractory oxide such as alumina. The proportion of silicalite in the support may vary in the range of 2 to 90% by weight, but preferably the support consists essentially of a heterogeneous dispersion of silicalite in a matrix of alumina or other porous refractory oxide. Such a dispersion contains silicalite in a minor proportion, usually between about 10 and 45%, and preferably between 10 and 35% by weight.

The hydrodewaxing catalyst is most preferably prepared in particulate form, with the clover-leaf particulate form shown in FIGS. 8 and 8A of U.S. Pat. No. 4,028,227 being most highly preferred. One convenient method for preparing the preferred catalyst involved first comulling a wetted mixture of calcined silicalite, an alumina gel, and an alumina binder material, such as peptized Catapal TM alumina, in proportions appropriate to what is desired in the final catalyst support. Such a comulled mixture is then extruded through a die having suitable small openings therein in the shape of circles or ellipses, or as is preferred, in the shape of three-leaf clovers. The extruded material is cut into small particulates, dried, and calcined, following which the resulting support particles are impregnated with a liquid solution containing the desired Group VIB element in dissolved form, with other active components, such as nickel, or even an acidic component, such as phosphorus, known for its property to promote hydrotreating reactions, being optionally included. A specifically contemplated impregnation liquid consists essentially of an aqueous solution of dissolved ammonium metatungstate and nickel nitrate, with the dissolved components being present in the impregnation liquid in proportions sufficient to insure that the final catalyst contains more than about 15% by weight tungsten components, calculated as $WO_3$, and more than about 0.5% by weight nickel components, calculated as NiO. If desired, phosphorus components may also be present in the impregnation liquid so that the final catalyst contains, for example, more than about 0.5% by weight phosphorus components, calculated as P. After impregnation, the impregnated composite particles are calcined in air at temperatures at or above about 900° F. for a time period sufficient to convert the metal components to oxide forms.

In an alternative method, the foregoing procedure is altered such that, instead of introducing the Group VIB and/or Group VIII metal components into the support by impregnation, they are incorporated into the catalyst by admixing an appropriate solid or liquid containing the desired metal with the materials to be extruded through the die. Such a method may prove less expensive and more convenient on a commercial scale than the impregnation method.

It is most highly preferred in the invention that the catalyst be converted to the sulfide form, that is, to a form wherein the metal components are converted in substantial part to sulfides. This may be accomplished by contacting the catalyst with a gas stream consisting of hydrogen and 10 volume percent hydrogen sulfide at an elevated temperature. Alternatively, if the waxy feedstock with which it is to be contacted contains organosulfur components, the catalyst may be merely placed into service in the oxide form, and under typical hydrodewaxing conditions, the catalyst is readily converted to the sulfide form in situ.

The waxy oil feedstock and the hydrodewaxing catalyst are brought in contact in a reactor vessel wherein, under suitable hydrodewaxing conditions, the waxy oil is upgraded to a product of lower waxy paraffin content, as evidenced by a reduction in pour point. Conditions of elevated temperature and pressure, plus the presence of added hydrogen, are required to obtain a significant amount of catalytic hydrodewaxing, the conditions generally being selected from the following Table I:

TABLE I

| Condition | Operating Conditions | |
|---|---|---|
| | Suitable | Preferred |
| Space Velocity, LHSV | 0.1–10 | 0.5–2.0 |
| Temperature, °F. | >650 | 700–800 |
| Pressure, p.s.i.g. | >500 | 550–3,000 |
| Total $H_2$ Introduced to Reactor, scf/bbl | >500 | 1,500–15,000 |

In addition, it is a critical feature of the present invention that ammonia be introduced into the reactor vessel wherein the hydrodewaxing reactions are carried out. The ammonia may be added in precursor form, as for example by adding a suitable nitrogen-containing organic compound, such as tert-butylamine, to the waxy oil entering the reaction zone. Under the hydrodewaxing conditions maintained in the reactor, the added organonitrogen compound is converted to, among other components, ammonia, which then serves the purposes of the invention herein. More preferably, however, ammonia is itself added to the reaction zone, as by direct addition into the reactor vessel; alternatively, the ammonia may be blended into either the waxy oil or the hydrogen gas stream entering the reactor vessel.

The amount of ammonia added to the reaction zone is such that the ammonia concentration of the gas phase in the reactor vessel is increased above the low levels which may be inherently present therein due to the conversion of organonitrogen components native to the waxy distillate. Lubricating oil feedstocks as a rule are relatively low in nitrogen content, usually containing below about 400 ppm by weight, even more usually, below 200 ppm by weight, and the amount of ammonia generated from this source is insufficient for purposes of the invention. In general, therefore, ammonia is added to the reactor vessel, either directly in the form of ammonia, or in precursor form, or in some mixture thereof, such that the weight ratio of the rate of the nitrogen added to the rate of entering feedstock is at least about 0.001, preferably at least 0.002, more preferably at least about 0.003, and most preferably between about 0.004 and 0.010.

The ammonia added to the hydrodewaxing reactor may be conserved by recycle, that is, the effluent from the hydrodewaxing reactor vessel may be separated into a liquid product containing the improved lubricating oil stock while hydrogen, ammonia, and light boiling hydrocarbons are recovered and recycled to the hydrodewaxing reactor. In this embodiment of the invention, which differs very significantly from conventional refinery practice in that ammonia is added to the reactor vessel and not removed from the recycle gases by water washing, or a similar operation, the usual practice is to add ammonia to the system at a rate equal to that lost by bleeding from the recycle gases. In so doing, the weight ratio of added nitrogen to feedstock may easily be maintained at a desired or specified value, with the added nitrogen being calculated as the sum of the nitrogen in the added ammonia plus that of the recycled ammonia, with the recycled ammonia in turn being the sum of previously added ammonia and ammonia produced from nitrogen native to the feed.

It has been found that the addition of ammonia in accordance with the invention yields several significant advantages. One such is that higher operating temperatures may be utilized in the hydrodewaxing zone maintained in the reactor vessel, and a high product yield is maintained but with a significant reduction in hydrogen consumption. In essence, ammonia renders the hydrodewaxing catalyst more selective for cracking waxy components and producing the desired lubricating oil product. Additionally, in comparison to operation without added ammonia, the method of the present invention provides for a product of similar pour point but of increased viscosity index. Further still, if the feedstock contains organonitrogen and/or organosulfur components, the addition of ammonia has been found not to interfere with the activity of the catalyst for removing these components by hydrogenation. These and other advantages of the invention will now be illustrated in the following Example, but it must be emphasized that the Example is provided for illustrative purposes only and not to limit the invention, which is defined by the claims.

EXAMPLE

A hydrodewaxing catalyst is prepared by first co-mulling a mixture of 65 weight percent gamma alumina, 20 weight percent peptized alumina, and 15 weight percent silicalite containing 0.74 weight percent alumina. The comulled material is extruded through a die having clover-leaf openings therein of maximum dimension of about 1/16 inch. The extruded matter is then cut into particulates of length varying between about ⅛ and ½ inch, following which the particulates are dried and calcined in air at 900° F. These particulates are then impregnated with an aqueous solution containing dissolved nickel nitrate and ammonium metatungstate, and after drying, the impregnated particulates are again calcined at 900° F. The finished catalyst contains 4 percent by weight nickel components, calculated as NiO, and 22 percent by weight tungsten components, calculated as $WO_3$.

The catalyst is placed in a suitable laboratory reactor vessel, sulfided in a 10 vol. % $H_2S$-90 vol. % $H_2$ gaseous environment at temperatures ranging from 450° to 750° F., and utilized to hydrodewax a waxy raffinate under the following conditions: 600 p.s.i.g. operating pressure, 2500 scf/bbl of once-through hydrogen, an operating temperature of 741° F., and a space velocity of 1.0 LHSV. The waxy raffinate has the properties and characteristics set forth in the following Table II:

TABLE II

| Raffinate Feed Characteristics and Properties | |
|---|---|
| Gravity, °API | 29.1 |
| Pour Point, °F. | 102 |
| Viscosity @ 140° F. | |
| CST | 25.47 |
| SUS | 121.7 |
| Viscosity @ 210° F. | |
| CST | 8.395 |
| SUS | 53.70 |
| Sulfur, wt. % | 0.053 |
| Nitrogen, wt. % | 0.014 |
| Carbon Residue, wt. % | 0.13 |
| Hydrogen, wt. % | 12.57 |
| Distillation, D-1160, °F. | |
| IBP/5 | 660/726 |
| 10/30 | 748/793 |
| 50/70 | 847/929 |
| 90/95 | 1065/— |
| Hydrocarbon Analysis, wt. % | |
| Paraffins | 20.3 |
| Mononaphthenes | 28.4 |
| Polynaphthenes | 30.5 |
| Aromatics | 20.8 |

The catalyst is then employed in a second run under the same conditions as before except that the operating temperature is increased to 749° F. and ammonia is added to the reactor vessel by introducing tertiary butylamine into the feedstock at a rate sufficient to provide a weight ratio of added nitrogen to feedstock of about 0.004 to 1. A summary of results obtained in the two runs is shown comparatively in the following Table III:

TABLE III

Comparative Results

| | Without NH₃ | With NH₃ |
|---|---|---|
| Full Range Properties | | |
| API gravity | 32.7 | 32.2 |
| Nitrogen ppvm | 40 | 48 |
| Sulfur ppvm | <5 | <5 |
| Boiling range, by Oldershaw vol. % | | |
| 185° F. | 2.6 | 0.8 |
| 400 | 15.9 | 10.9 |
| 700 | 29.4 | 26.1 |
| 925 | 76.1 | 76.6 |
| 700° F. plus Product | | |
| Yield, vol. % | 67.2 | 67.0 |
| Pour point, °F. | 27 | 23 |
| Viscosity CS, | | |
| 40° C. | 71.40 | 66.26 |
| 100° C. | 8.964 | 8.611 |
| V I as produced | 98.5 | 100.6 |
| V I corrected to | 95.1 | 98.0 |
| +10 pour point | | |
| Hydrogen Consumption, scf/bbl | 693 | 667 |

The foregoing Example illustrates how a waxy raffinate or other suitable feedstock can be upgraded by the hydrodewaxing method of the invention to yield a product effluent containing a desired lubricating oil base stock, which base stock, in the case of the experiment described in the Example, is a liquid fraction boiling above 700° F. In the most usual case, and especially in the preferred embodiment, this 700° F.+ fraction or other lubricating oil base stock product having an initial boiling point of 650° F. or more and an end point usually below about 1150° F. is recovered from the remainder of the product effluent of the hydrodewaxing reactor. This may be accomplished, for example, by first separating gases from the liquid portion of the effluent in a suitable liquid-gas separator, followed by distilling off the light ends boiling below the desired initial point. The resultant base stock may then be treated as necessary to produce the finished lubricating oil, such treatments including, for example, distillation into a more narrow boiling range, blending with other lubricating oil stocks, and/or blending with additives (e.g., corrosion inhibitors, anti-oxidants, anti-wear ingredients, and the like).

The data in the Example also indicate that, in comparison to operation without added ammonia, the method of the invention proves superior. A low pour point (i.e., below 30° F.) product is obtained in a similar yield as in the absence of added ammonia. But with added ammonia, a more elevated temperature may be utilized to obtain a higher VI product while substantially reducing hydrogen consumption. As evidenced by the data in Table III of the Example, the VI of the product is usually at least 2 units higher with ammonia addition, and the hydrogen consumption is reduced by at least 5%, usually by at least about 10%.

Also noteworthy in the data in the Example is that similar reductions in nitrogen levels are obtained in the products, and this despite the fact that the feedstock contains far more nitrogen components (due to addition of tertiary butylamine) when treated in accordance with the invention. The addition of ammonia did not interfere with the hydrogenation activity of the catalyst for reducing the concentrations of organosulfur and organonitrogen components to extremely low levels, i.e., from above 500 wppm to less than 5 wppm in the case of the organosulfur components, calculated as sulfur, and from above 140 wppm to less than 50 wppm in the case of the organonitrogen components, calculated as nitrogen.

Although the invention has been described in conjunction with a preferred embodiment and an Example thereof, it is apparent that the invention is capable of many modifications, alternatives, and variations. Accordingly, it is intended to embrace within the invention all such modifications, alternatives, and variations as may fall within the spirit and scope of the appended claims.

We claim:

1. In the refining of lubricating oils, the improvement comprising catalytically hydrodewaxing a waxy hydrocarbon feedstock in the presence of a catalyst containing a crystalline dewaxing component and in the further presence of ammonia or ammonia precursors added in an amount above that native to the feedstock.

2. A process for upgrading a lubricating oil feedstock comprising contacting the feedstock with a hydrodewaxing catalyst containing a crystalline dewaxing component, under hydrodewaxing conditions including an elevated temperature and pressure and the presence of hydrogen, and in the presence of ammonia or ammonia precursors added in an amount above that native to the feedstock, so as to produce an oil product of improved lubrication properties and recovering said oil product.

3. A process for upgrading a waxy oil feedstock comprising contacting the feedstock with a hydrodewaxing catalyst containing a crystalline dewaxing component, under hydrodewaxing conditions including an elevated temperature and pressure and the presence of hydrogen, and in the presence of ammonia or ammonia precursors added in an amount above that native to the feedstock, so as to produce a lubricating oil product of decreased pour point and increased viscosity index, and recovering said lubricating oil product.

4. A process as defined in claim 2 or 3 wherein said hydrodewaxing catalyst comprises a dewaxing component selected from the group consisting of the ZSM-5 family of zeolites.

5. A process as defined in claim 2 or 3 wherein said hydrodewaxing catalyst comprises a catalytically active dewaxing component comprising a crystalline silica polymorph.

6. A process as defined in claim 5 wherein said crystalline silica polymorph has pores of openings of maximum cross-sectional dimension greater than about 5 Å.

7. A process as defined in claim 6 wherein said openings have a maximum cross-sectional dimension no greater than about 6 Å.

8. A process as defined in claim 5 wherein said crystalline silica polymorph is a silicalite having an X-ray powder diffraction pattern similar to ZSM-5.

9. A process as defined in claim 5 wherein said crystalline silica polymorph adsorbs benzene under ambient conditions but rejects neopentane.

10. A process as defined in claim 1, 2, or 3 wherein the weight feedrate of added ammonia and ammonia precursors calculated as nitrogen, to the weight feedrate of the feedstock is at least 0.001.

11. A process as defined in claim 4 wherein the weight feedrate of added ammonia and ammonia precursors, calculated as nitrogen, to the weight feedrate of the feedstock is at least 0.002.

12. A process as defined in claim 5 wherein the weight feedrate of added ammonia and ammonia precursors, calculated as nitrogen, to the weight feedrate of the feedstock is at least 0.002.

13. A process as defined in claim 7 wherein the weight feedrate of added ammonia and ammonia precursors, calculated as nitrogen, to the weight feedrate of the feedstock is at least 0.003.

14. A process as defined in claim 9 wherein the weight feedrate of added ammonia and ammonia precursors, calculated as nitrogen, to the weight feedrate of the feedstock is at least 0.003.

15. A process as defined in claim 2 or 3 wherein said hydrodewaxing catalyst comprises a crystalline catalytically active dewaxing component having an X-ray powder diffraction pattern essentially the same as ZSM-5 zeolite.

16. A process for catalytically hydrodewaxing hydrocarbons comprising (1) contacting a waxy oil boiling primarily above 650° F. with a hydrodewaxing catalyst comprising a Group VIB metal component on a support comprising a silicalite, said silicalite containing less than about 0.75 weight percent of Group IIIA elements, calculated as the oxides thereof, with said contacting being at an elevated temperature and pressure, and in the presence of hydrogen and added ammonia or ammonia precursors, with the amount of said added ammonia or ammonia precursors being above that native to said waxy oil and (2) recovering a product lubricating oil from the products of said contacting, said lubricating oil being of substantially reduced pour point and of increased viscosity index in comparison to that portion of the waxy oil boiling in the same range as the lubricating oil.

17. A process as defined in claim 16 wherein the weight ratio of added ammonia and ammonia precursors, calculated as nitrogen, to the waxy oil is above about 0.004.

18. A process as defined in claim 16 wherein, in step (2), a recycle gas stream is recovered and recycled to step (1), and said recycle stream contains ammonia from previously added ammonia and from nitrogen native to the waxy oil.

19. A process as defined in claim 18 wherein the ratio of added, calculated as the weight feedrate of nitrogen in the added ammonia plus the recycled ammonia, to the weight feedrate of the waxy oil is maintained at a predetermined value.

20. A process as defined in claim 16, 17, 18 or 19 wherein said silicalite has an X-ray powder diffraction pattern and a pore structure essentially similar to ZSM-5 zeolite.

21. A process as defined in claim 16, 17, 18, or 19 wherein said catalyst comprises a Group VIB metal component and a Group VIII metal component on a support comprising said silicalite and a porous refractory oxide.

22. A process as defined in claim 1 wherein the catalytic hydrodewaxing is carried out in the presence of a catalyst comprising a Group VIB metal component and a Group VIII metal component on a support comprising a porous refractory oxide and a silica polymorph consisting essentially of crystalline silica.

23. A process as defined in claim 22 wherein said silica polymorph comprises silicalite.

24. A process as defined in claim 2 or 3 wherein said hydrodewaxing catalyst comprises a Group VIB metal component and a Group VIII metal component on a support comprising a porous refractory oxide and a silica polymorph consisting essentially of crystalline silica.

25. A process as defined in claim 24 wherein said silica polymorph comprises silicalite.

26. A process as defined in claim 22 or 23 wherein the total weight feedrate of added ammonia and ammonia precursors, calculated as nitrogen, to the weight feedrate of the feedstock is at least 0.001.

27. A process as defined in claim 22 or 23 wherein the total weight feedrate of added ammonia and ammonia precursors, calculated as nitrogen, to the weight feedrate of the feedstock is at least 0.002.

28. A process as defined in claim 24 wherein the total weight feedrate of added ammonia and ammonia precursors, calculated as nitrogen, to the weight feedrate of the feedstock is at least 0.003.

29. A process as defined in claim 22 or 23 wherein the total weight feedrate of added ammonia and ammonia precursors, calculated as nitrogen, to the weight feedrate of the feedstock is at least 0.004.

30. A process as defined in claim 25 wherein the total weight feedrate of added ammonia and ammonia precursors, calculated as nitrogen, to the weight feedrate of the feedstock is at least 0.001.

31. In the refining of lubricating oils, the improvement comprising catalytically hydrodewaxing a substantial amount of a waxy hydrocarbon feedstock in the presence of ammonia or ammonia precursors added in an amount above that native to the feedstock.

32. A process for upgrading a lubricating oil feedstock comprising contacting the feedstock with a hydrodewaxing catalyst, under conditions producing substantial hydrodewaxing, including an elevated temperature and pressure and the presence of hydrogen, and in the presence of ammonia or ammonia precursors added in an amount above that native to the feedstock, and recovering an oil product of improved lubrication properties from said contacting.

33. A process for upgrading a waxy oil feedstock comprising contacting the feedstock with a hydrodewaxing catalyst, under conditions producing substantial hydrodewaxing, including an elevated temperature and pressure and the presence of hydrogen, and in the presence of ammonia or ammonia precursors added in an amount above that native to the feedstock, and recovering a lubricating oil product of decreased pour point and increased viscosity index from said contacting.

34. A process as defined in claim 31, 32, or 33 wherein the total weight feedrate of added ammonia and ammonia precursors, calculated as nitrogen, to the weight feedrate of the feedstock is at least 0.001.

35. A process as defined in claim 31, 32, or 33 wherein the total weight feedrate of added ammonia and ammonia precursors, calculated as nitrogen, to the weight feedrate of the feedstock is at least 0.004.

36. A process as defined in claim 31, 32, or 33 wherein said hydrodewaxing is carried out in the presence of a hydrodewaxing catalyst comprising a Group VIB metal component and a Group VIII metal component on a support comprising a porous refractory oxide and a silica polymorph consisting essentially of crystalline silica.

37. A process as defined in claim 36 wherein said silica polymorph comprises silicalite.

38. A process as defined in claim 35 wherein said hydrodewaxing is carried out in the presence of a hydrodewaxing catalyst comprising a Group VIB metal component and a Group VIII metal component on a support comprising a porous refractory oxide and silicalite.

* * * * *

UNITED STATES PATENT AND TRADEMARK OFFICE
CERTIFICATE OF CORRECTION

PATENT NO. : 4,428,825

DATED : January 31, 1984

INVENTOR(S) : JOHN W. WARD and TIMOTHY L. CARLSON

It is certified that error appears in the above–identified patent and that said Letters Patent are hereby corrected as shown below:

In column 11, line 42, after the word "added" insert the word "nitrogen.

Signed and Sealed this

Seventh Day of August 1984

[SEAL]

Attest:

GERALD J. MOSSINGHOFF

Attesting Officer

Commissioner of Patents and Trademarks